United States Patent [19]

Lebby et al.

[11] Patent Number: 5,428,704
[45] Date of Patent: Jun. 27, 1995

[54] OPTOELECTRONIC INTERFACE AND METHOD OF MAKING

[75] Inventors: Michael S. Lebby, Apache Junction; Christopher K. Y. Chun, Mesa; Shun-Meen Kuo, Chandler; Davis H. Hartman, Phoenix, all of Ariz.

[73] Assignee: Motorola, Inc., Schaumburg, Ill.

[21] Appl. No.: 260,625

[22] Filed: Jun. 16, 1994

Related U.S. Application Data

[63] Continuation-in-part of Ser. No. 95,453, Jul. 19, 1993, abandoned, and a continuation-in-part of Ser. No. 95,454, Jul. 19, 1993, abandoned.

[51] Int. Cl.$^6$ .............................. G02B 6/00; G02B 6/36
[52] U.S. Cl. .................................................... 385/92
[58] Field of Search ................ 385/32, 14, 42, 69, 385/88–94

[56] References Cited

U.S. PATENT DOCUMENTS

| | | | |
|---|---|---|---|
| 4,490,020 | 12/1984 | Sakaguchi et al. | 385/49 X |
| 4,540,246 | 9/1985 | Fantone | 385/31 X |
| 4,787,696 | 11/1988 | Norris et al. | 385/89 |
| 4,826,272 | 5/1989 | Pimpinellae | 385/93 |
| 4,834,494 | 5/1989 | DeMeritt et al. | 385/61 |
| 4,911,519 | 3/1990 | Burton et al. | 385/14 |
| 4,946,553 | 8/1990 | Courtney et al. | 385/88 X |
| 5,165,002 | 11/1992 | Cumberledge et al. | 385/88 X |

Primary Examiner—Akm E. Ullah
Attorney, Agent, or Firm—Gary F. Witting

[57] ABSTRACT

An interconnect substrate (116) having a surface (105) with a plurality of electrical tracings (115) disposed thereon. A photonic device (114) having a working portion (118) and having a contact (106) electrically coupled to one of the plurality of electrical tracings (115) disposed on the interconnect substrate (116). A molded optical portion (112) that encapsulates the photonic device (114) is formed. The molded optical portion (112) forms a surface (120). The surface (120) passes light between the photonic device (114) and an optical fiber(103). Alignment of optical fiber 103 is achieved by an alignment apparatus (117) that is formed in the molded optical portion (112).

42 Claims, 7 Drawing Sheets

OPTOELECTRONIC INTERFACE AND METHOD OF MAKING

This application is a continuation-in-part of prior application Ser. No. 08/095,453 and 08/095,454, both filed Jul. 19, 1993, now abandoned.

BACKGROUND OF THE INVENTION

This invention relates, in general, to fabrication of an optical device and, more particularly, to the fabrication of an optoelectronic interface.

This application is related to U.S. Pat. No. 5,265,184, issued on Nov. 23, 1993, that bears Ser. No. 07/889,335, entitled MOLDED WAVEGUIDE AND METHOD OF MAKING SAME, and filed on May 28, 1992.

At present, coupling of an optical fiber having a core region to a photonic device is a difficult task that typically is achieved by either a manual method or a semi-automatic method. Generally, both the manual and the semi-automated methods are complex, inefficient, and are not suitable for high volume manufacturing.

A major problem associated with the coupling of the optical fiber to the photonic device is alignment of a working portion of the photonic device to the core region of the optical fiber. Moreover, it should be pointed out that the working portion of the optical fiber generally is required to be not only perpendicular, but also to be within an area described by the working portion of the photonic device so as to allow light that is either transmitted or received by the photonic device to be efficiently and effectively coupled to the core region of the optical fiber, thus necessitating extremely tight or restrictive alignment tolerances between the working portion of the photonic device and the core region of the optical fiber.

Presently, coupling of the working portion of the photonic device and the core region of the optical fiber typically is achieved by actively aligning both the photonic device and the optical fiber. For example, with the photonic device being a laser and with the optical fiber having an optical detector coupled to one end of the optical fiber, the laser is activated and the other end is carefully moved or adjusted until the core region of the optical fiber is aligned to the working portion of the laser so that a maximum amount of light is captured by the core region of the optical fiber as indicated by the photodetector. However, many problems arise by aligning the photonic device and the core region of the optical fiber by active alignment, such as being extremely labor intensive, being costly, having a potential of poor accuracy of the alignment, and the like. Further, if the misalignment is severe enough, unsuitable product is manufactured, thus increasing costs and reducing manufacturing capacity. It should be understood that having the aforementioned problems are not amenable to a high volume manufacturing environment.

It can be readily seen that the present methods for aligning a photonic device to an optical fiber have severe limitations. Also, it is evident that the present fabrication methods or interconnection methods for a coupling a photonic device to the optical fiber are not only complex and expensive, but also not amenable to high volume manufacturing. Therefore, an article and a method for interconnecting or coupling a photonic device to an optical fiber that is cost effective, simplistic, and manufacturable in a high volume manufacturing setting is highly desirable.

SUMMARY OF THE INVENTION

Briefly stated, an optoelectrical interface and a method of making same are provided. An interconnect substrate having a surface with a plurality of electrical tracings disposed on the surface of the interconnect substrate is provided. A photonic device having a working portion and having a contact electrically coupled to one of the plurality of electrical tracings is disposed on the interconnect substrate. A molded optical portion that encapsulates the photonic device is formed. The molded optical portion forms a surface for directing light between the photonic device and an optical fiber. An alignment apparatus is formed in the molded optical portion for position of the optical fiber to the working portion of the photonic device.

An advantage of the present invention is to relax alignment tolerances between a working portion of a photonic device and a core region of an optical fiber.

Another advantage of the present invention is to provide a optoelectronic interface that is highly manufacturable.

DETAILED DESCRIPTION OF THE DRAWINGS

Figure 1:
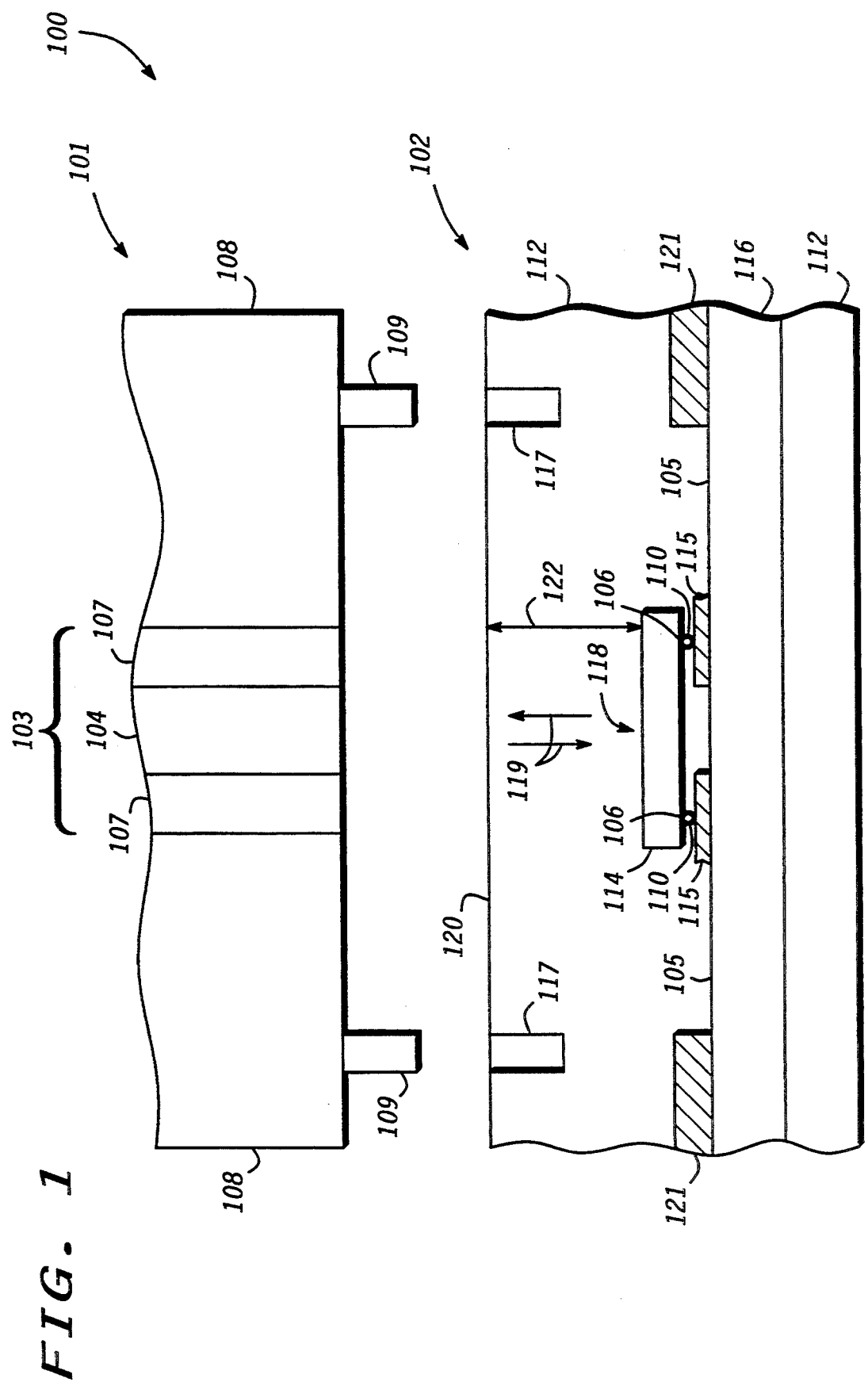
FIG. 1 is a highly enlarged simplified diagrammatic partial cross-sectional illustration of an optoelectronic interface module.

FIG. 1 shows an enlarged simplified diagrammatic partial cross-sectional illustration of an optoelectronic interface module 100. Additionally, an optical connector 101 illustrated in cross-sectional view reveals an optical fiber 103 having a core region 104 and a cladding region 107, a body 108, and alignment devices 109. Further, optoelectronic device 102, illustrated in cross-sectional view, reveals a molded optical portion 112, an optical surface 120, a photonic device 114, electronic tracings 115, an interconnect substrate 116, and alignment devices 117. It should be understood that FIG. 1 is a partial cross-sectional view and that optoelectronic interface module 100 can extend not only into and out of the drawing but also laterally across the drawing. Additionally, while only a single optical fiber 103 and a single photonic device 114 are shown in FIG. 1, it should be understood that arrays of optical fibers, lens devices, and photonic devices are capable of being present in optoelectronic interface module 100. In the present invention, a novel combination of elements and processes are described that allow for accurate and efficient interconnection or coupling of optical fiber 103 to a working portion 118 of photonic device 114 through optical portion 112.

Generally, interconnect substrate 116 is capable of being any suitable well-known interconnect substrate, such as a printed circuit board, a ceramic interconnect substrate, a printed wire board, or the like. Typically, interconnect substrate 116 provides a surface 105 having a plurality of electrical conductive pathways or electrical tracings, represented by electrical tracings 115, that interconnect a variety of electrical components (not shown), such as integrated circuits, resistors, capacitors, and the like to members 121 and photonic device 114, thereby electrically coupling the variety of electrical components to photonic device 114.

Members 121 are capable of being any suitable input and output apparatus, such as lead frame members, wire bond connections, electrically conductive bumps, or the like. However, in a preferred embodiment of the present invention, lead frame members are used to input and output electrical signals to and from optoelectronic device 102. For example, lead frame members are electrically and mechanically coupled to electrical tracing 115 and subsequently overmolded, thereby securing members 121 and electrical tracings 115. Further, it should be understood that members 121 are operably coupled to electrical tracings 115, thereby enabling electrical signals to be inputted and outputted through electrical tracings 115.

Photonic device 114 is capable of being either a photo-transmitter or a photo-receiver that either emits light or receives light, respectively, as indicated by arrows 119. When photonic device 114 is a photo-transmitter, the photo-transmitter is capable of being any suitable light emitting device, such as a light emitting diode (LED), a vertical cavity surface emitting laser (VCSEL), or the like. Additionally, when photonic device 114 is a photo-receiver, photonic device 114 is capable of being any suitable light receiving device, such as a photodiode, a p-i-n photodiode, or the like. However, in a preferred embodiment of the present invention, when photonic device 114 is a photo-transmitter, and when photonic device 114 is a photo-receiver, photonic device 114 is either a vertical cavity surface emitting laser (VCSEL) or a p-i-n photodiode, respectively.

Generally, photonic device 114 is made separately and subsequently electrically and mechanically joined to electrical tracings 115 through contacts 106 by any suitable method, such as manually, semi-automatically, or fully automatically. In a preferred embodiment of the present invention, photonic device 114 is joined or mounted to electrical tracings 115 using an automatic system such as a robotic arm (not shown), thereby ensuring precise and accurate placement or mounting of photonic device 114 on tracings 115.

Generally, molded optical portion 112 is made utilizing the teachings of U.S. Patent having U.S. Pat. No. 5,265,184 that bears Ser. No. 07/889,335, titled MOLDED WAVEGUIDE AND METHOD OF MAKING SAME, and filed on May 28, 1992.

Briefly, molded optical portion 112 is made of any suitable optical material such as plastics, epoxies, polymers, or the like. In the present invention, prepared interconnect substrate 116, having photonic device 114 mounted thereon and members 121 operably coupled to electrical tracings 115, is placed into a molding system (not shown) and overmolded with molded optical portion 112, thereby encapsulating photonic device 114.

Once the molding process is completed, molded optical portion 112 is formed or molded with optical surface 120 having a distance or a height 122 between surface 120 and working portion 118, represented by arrow 122.

Moreover, it should be understood that additional processing is sometimes carried out on optical surface 120 to enhance optical performance of optical surface 120. For example, optical surface 120 is capable of being polished so as to make optical surface 120 more transparent, thereby increasing the transmission of light 119 through optical surface 120. Further, optical surface 120 is capable of being polished or lapped to remove a portion of optical portion 112 of optical surface 120 so as to adjust the distance or the height 122 between optical surface 120 and working portion 118 of photonic device 114.

Materials used for optical portion 112 are optically clear with refractive indexes that are similar to refractive indexes of optical fiber 103, thereby allowing light 119 to pass through optical surface 120. However, while refractive index of optical portion 112 is capable of including the range of refractive indexes of optical fiber 103, in a preferred embodiment of the present invention, refractive index of optical portion 112 is similar or matches the refractive index of that of core region 104. By molding optical portion 112 and forming optical surface 120 light 119 is guided directly from either working portion 118 of photonic device 114 to core region 104 or from core region 104 to working portion 118 through optical portion 112. However, it should be understood that optimization of several parameters, such as height or distance 122, refractive indexes of optical components (e.g., optical fiber 103, optical portion 112), size of working portion 118 of photonic device 114, and the like need to be considered so as to provide the proper physical dimensions to optimize performance of optoelectronic interface 100. Further, alignment devices 117 are made by any suitable method, such as molding, milling, or the like. However, in a preferred embodiment of the present invention, alignment devices 117 are molded simultaneously with optical portion 112, thereby providing accurate and precise alignment or placement of alignment devices 117 in relation to each other.

Electrical signals that either stimulate working portion 118 of photonic device 114 or electrical signals that are elicited from light stimulating working portion 118 of photonic device 114 are sent through conductive tracks 115. As previously indicated, conductive tracks 115 are made by any suitable well-known method in the art. The electrical signals are then passed through conductive bumps 110 that are made by any suitable method well known in the art, such as solder bumps, gold bumps, conductive epoxy bumps, or the like. However, in a preferred embodiment of the present invention, gold bumps are used to provide a secure mechanical and electrical connection between electronic tracings 115 and photonic device 114.

Optical connector 101 is made such that optical fiber 103 is held in a fixed position in relation to alignment devices 109, thereby providing a spatial orientation between core region 104 and alignment devices 109. Further, alignment devices 109 are positioned such that alignment devices 109 are capable of engaging alignment devices 117 of molded optical portion 112. In a preferred embodiment of the present invention, alignment devices 109 are detachably engaged with alignment devices 117 of molded optical portion 112, thereby aligning core region 104 to working portion 118 of photonic device 114. In the present invention, alignment of both core region 104 of optical fiber 103 and alignment of photonic device 114 are substantially relaxed, thereby providing a more manufacturable optoelectronic interface device 100 that does not require active alignment.

Figure 2:
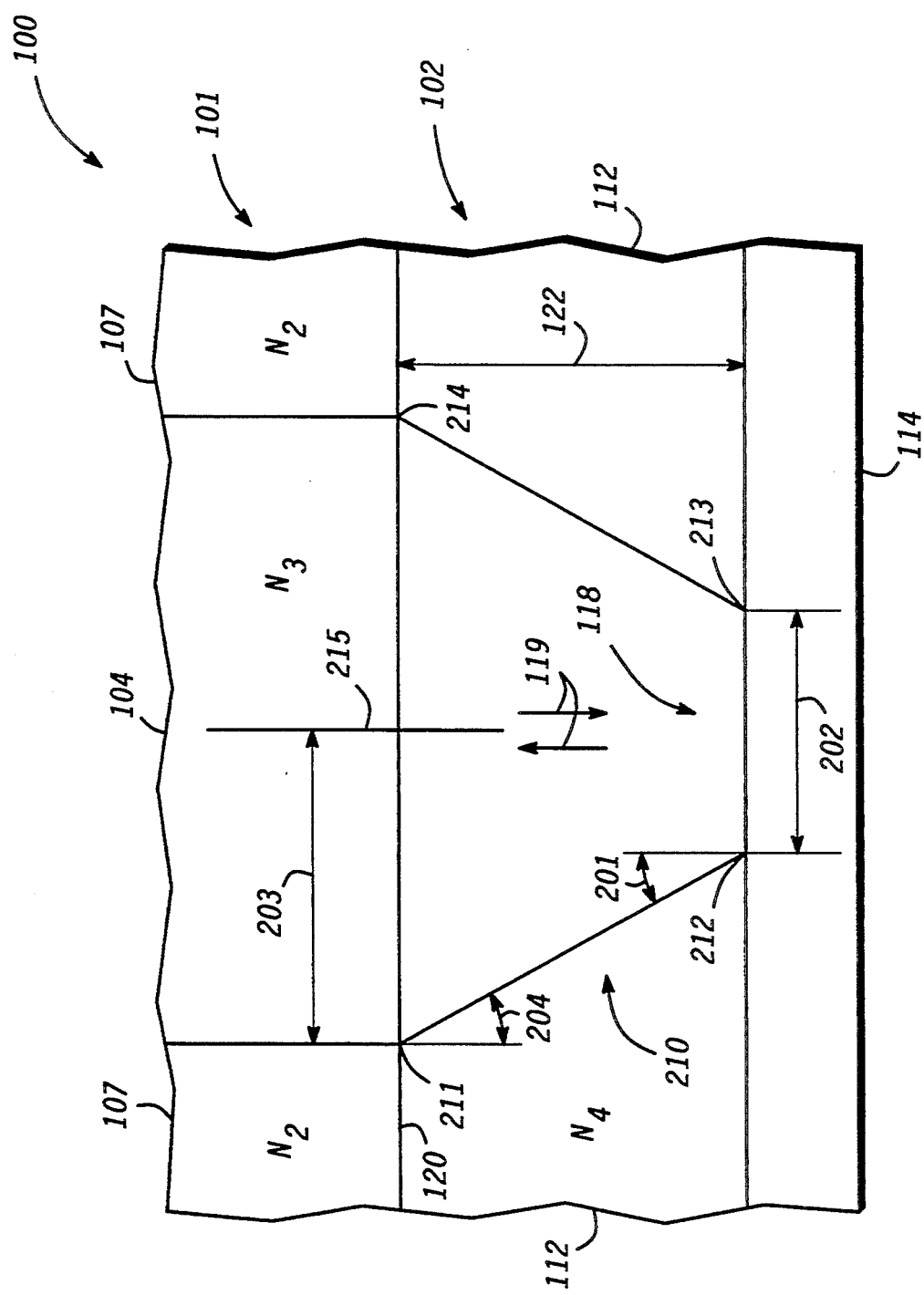
FIG. 2 is a highly enlarged simplified partial cross-section portion of the optoelectronic interface module shown in FIG. 1.

Regarding FIG. 2, a highly enlarged simplified diagrammatic partial cross-sectional portion of optoelectronic interface module 100 is illustrated. It should be understood that features having similar or identical functions as illustrated in FIG. 1 will retain their original identifying numerals. As illustrated in FIG. 2, optical connector 101 is mated to optoelectronic device 102, thereby bringing core region 104 in alignment with working portion 118 of photonic device 114 and optically coupling working portion 118 and core region 104.

In order to optimize optical coupling of light 119 between core region 104 and working portion 118, a distance or a height 122 is determined. Determination of distance or height 122 is achieved by solving the following mathematical inequality:

$$h \leq \frac{x - \frac{d}{2}}{\tan \theta_{2c}}$$

where h is equal to distance or height 122 between surface 120 and working portion 118, where $\theta_{2c}$ (represented by arc 201 and 204) is equal to a critical angle or an acceptance angle, where d is equal to a width or a distance 202 of working portion 118 of photonic device 114, and where x is equal to one half of a desired spot size, represented by arrow 203 on optical surface 120. Further, it should be understood, for purpose of illustration only, that geometric configuration of working portion 118 describes a circle, thus x is a radius of the circle. Additionally, with values for d and x known or selected, respectively, only acceptance angle $\theta_{2c}$ needs to be further defined.

Acceptance angle or critical angle $\theta_{2c}$ is determined by solving the following mathematical inequality:

$$\theta_{2c} \leq \sin^{-1}\left[\frac{n_3}{n_4} \cos\left(\sin^{-1}\left(\frac{n_2}{n_3}\right)\right)\right]$$

Refractive indexes of core region 104, cladding region 107, and optical portion 112 are well-known material constants that are identified as $n_3$, $n_2$, and $n_4$ respectively. Solving for $\theta_{2c}$ results in determination of acceptance angle $\theta_{2c}$, represented by arcs 201 and 204. Acceptance angle $\theta_{2c}$ determines an angle in which light is capable of being coupled between working portion 118 and core region 104. It should be understood that angle $\theta_{2c}$ represents an acceptance cone 210 that is defined by points 211, 212, 213, and 214 that rotate about an optical axis 215.

With acceptance angle $\theta_{2c}$ having been determined or calculated by the previously described equation, with values for refractive indexes, with distance 202 known, and with X, represented by arrow 203, known, substitution of these values into the first described equation is performed to determine height or distance 122.

Figure 3:
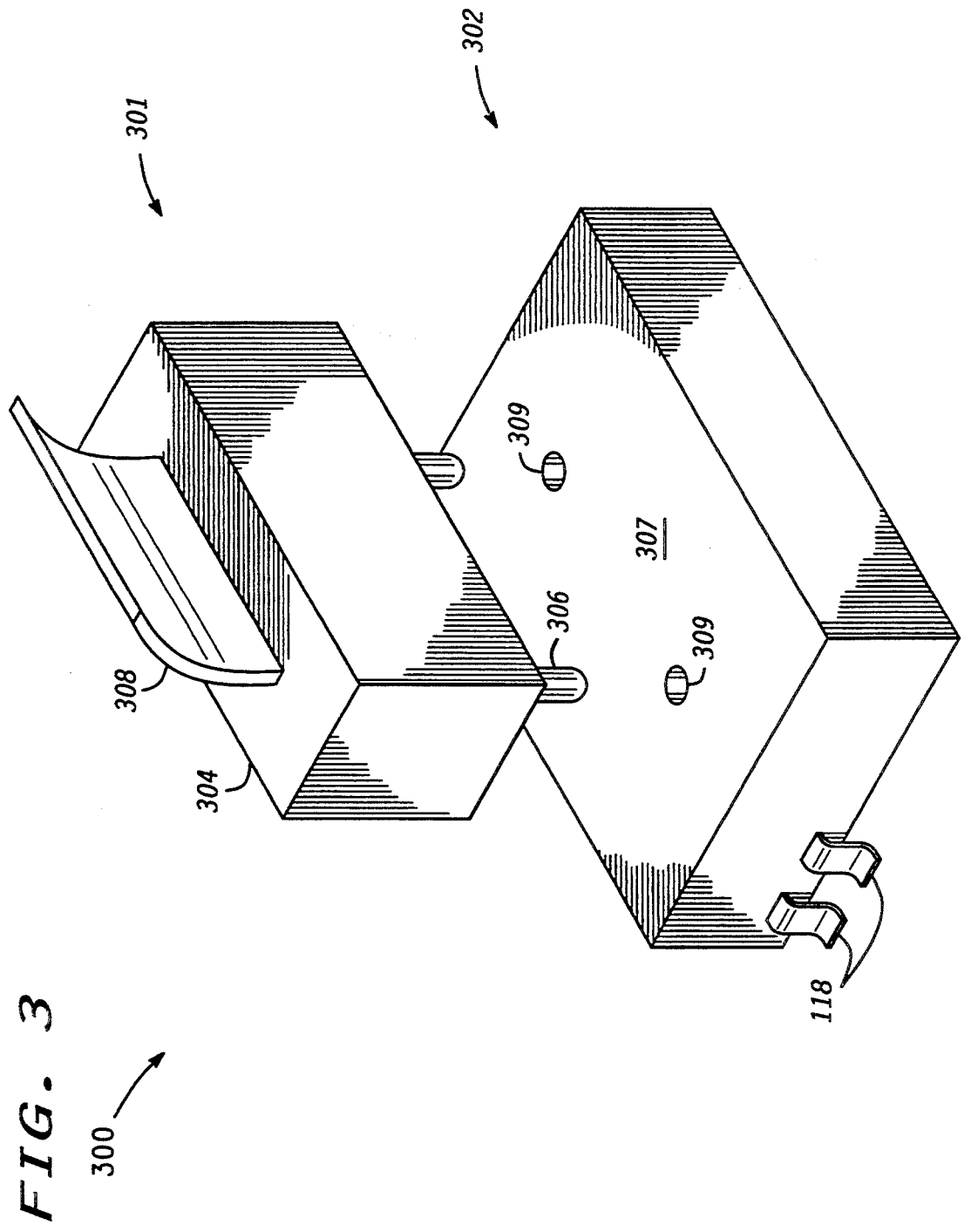
FIG. 3 is an enlarged perspective view of another optoelectronic interface module.

FIG. 3 is an enlarged perspective view of an optoelectronic interconnect module 300. Optoelectronic interface module 300 includes optical connector 301 and optoelectronic interface device 302. As can be seen in FIG. 3, optical connector 301 is made having a plurality of optical fibers (not shown) formed in an optical cable 308 that are held or fixed and positioned by a body 304 in such a manner that a plurality of core regions (not shown) of the plurality of optical fibers are exposed so as to be able to be operably coupled to photonic devices (not shown) in optoelectronic interface device 302. Further, optical connector 301 is made with alignment devices 306 (only one is shown), thereby fixing spatial orientation of the plurality of core regions in relation to body 304. Insertion of alignment devices 306 into molded optical devices 309 aligns the plurality of core regions to the plurality of working portion of the plurality of photonic devices in optoelectronic interface device 302.

Optoelectronic interface device 302 is made in a similar manner as has been described hereinabove. Engagement of alignment devices 306 with alignment devices 309 aligns the plurality of core regions in fiber optic cable 308 with the plurality of photonic devices in optoelectronic interface device 302 such that the plurality of core regions are operably or optically engaged to the plurality of photonic devices so to pass light through surface 307 and into and out of optoelectronic interface device 302. Additionally, output members 118 are seen extending from optoelectronic interface device 302. These output members 118 are then capable of being further electrically interconnected to other electronic components or systems, such as printed circuit boards, computer boards, or the like.

Figure 4:
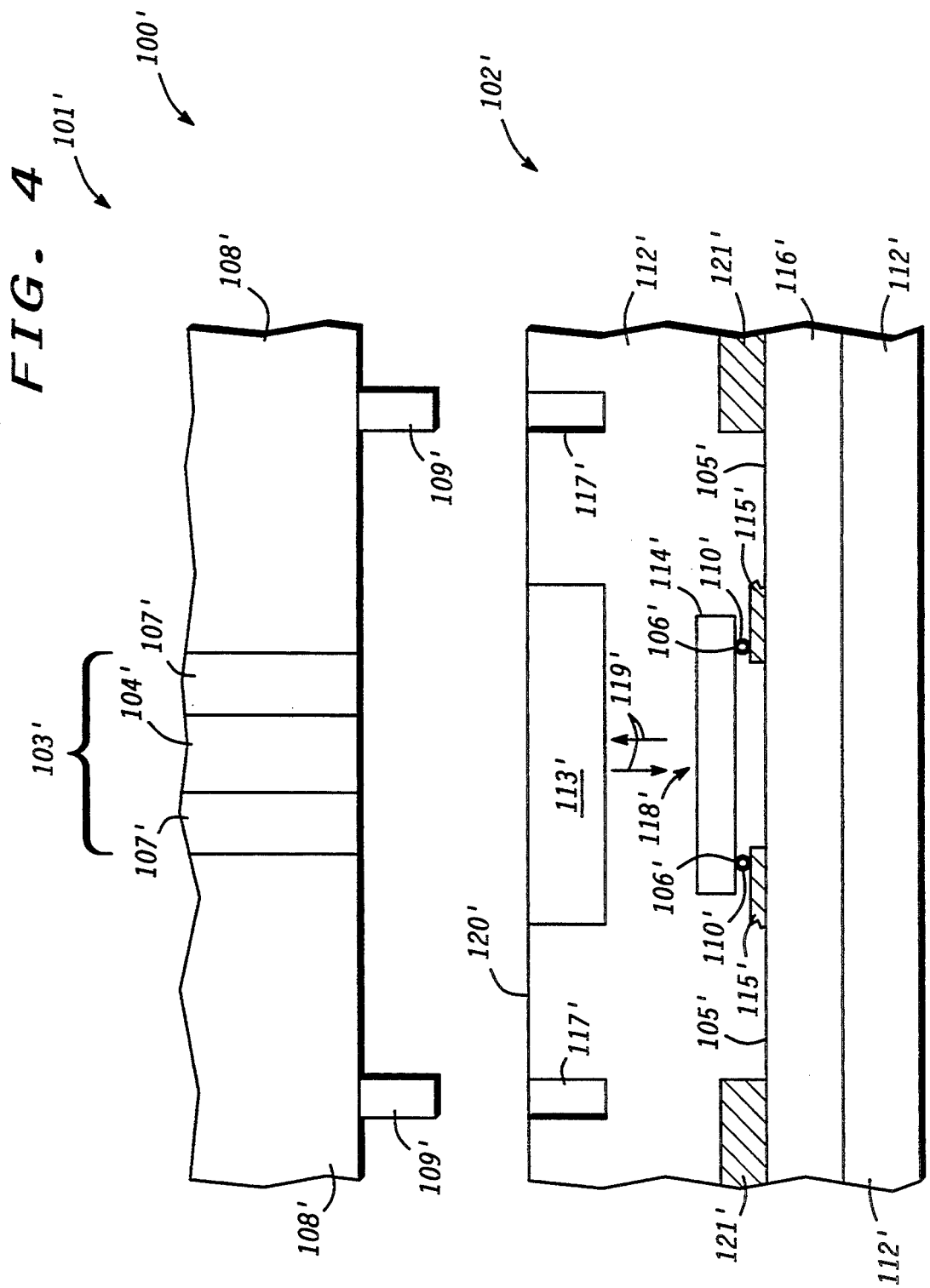
FIG. 4 is an enlarged simplified diagrammatic partial cross-sectional illustration of yet another optoelectronic interface module.

FIG. 4 shows an enlarged simplified diagrammatic partial cross-sectional illustration of an optoelectronic interface module 100'. Additionally, optical connector 101' illustrated in cross-sectional view reveals an optical fiber 103' having a core region 104' and a cladding region 107', a body 108', and alignment devices 109'. Further, optoelectronic device 102', illustrated in cross-sectional view, reveals a molded optical portion 112', a lens device 113', a photonic device 114', electronic tracings 115', an interconnect substrate 116', and alignment devices 117'. It should be understood that FIG. 4 is a partial cross-sectional view and that optoelectronic interface module 100' an extend non only into and out of the drawing but also Laterally across the drawing. Additionally, while only a single optical fiber 103', a single lens device 113', and a single photonic device 114' are shown in FIG. 4, it should be understood that arrays of optical fibers, lens devices, and photonic devices are capable of being present in optoelectronic interface module 100'. In the present invention, a novel combination of elements and processes are described that allow for accurate and efficient interconnection or coupling of optical fiber 103' to a working portion 118' of photonic device 114' through lens device 113'.

Generally, interconnect substrate 116' is capable of being any suitable well-known interconnect substrate, such as a printed circuit board, a ceramic interconnect substrate, a printed wire board, or the like. Typically, interconnect substrate 116' provides a surface 105' having a plurality of electrical conductive pathways or electrical tracings, represented by electrical tracings 115', that innerconnect a variety of electrical components (not shown), such as integrated circuits, resisters, capacitors, and the like to members 121' and photonic device 114' thereby electrically coupling the variety of electrical components to photonic device 114'.

Members 121' are capable of being any suitable input and output apparatus, such as lead frame members, wire bond connections, electrically conductive bumps, or the like. However, in a preferred embodiment of the present invention, lead frame members are used to input and output electrical signals to and from optoelectronic device 102'. For example, lead frame members are electrically and mechanically coupled to electrical tracing 115' and subsequently overmolded, thereby securing members 121' and electrical tracings 115'. Further, it should be understood that members 121' are operably coupled to electrical tracings 115', thereby enabling electrical signals to be inputted and outputted through electrical tracings 115'.

Photonic device 114' is capable of being either a photo-transmitter or a photo-receiver that either emits light or receives light, respectively, as indicated by arrows 119'. When photonic device 114' is a photo-transmitter, the photo-transmitter is capable of being any suitable light emitting device, such as a light emitting diode (LED), a vertical cavity surface emitting laser (VCSEL), or the like. Additionally, when photonic device 114' is a photo-receiver, photonic device 114' is capable of being any suitable light receiving device, such as a photodiode, a p-i-n photodiode, or the like. However, in a preferred embodiment of the present invention, when photonic device 114' is a photo-transmitter, and when photonic device 114' is a photo-receiver, photonic device 114' is either a vertical cavity surface emitting laser (VCSEL) or a p-i-n photodiode, respectively.

Generally, photonic device 114' is made separately and subsequently electrically and mechanically joined to electrical tracings 115' through contacts 106' by any suitable method, such as manually, semi-automatically, or fully automatically. In a preferred embodiment of the present invention, photonic device 114' is joined or mounted to electrical tracings 115' using an automatic system such as a robotic arm (not shown), thereby ensuring precise and accurate placement or mounting of photonic device 114' on tracings 115'.

Generally, molded optical portion 112' is made utilizing the teachings of U.S. Patent bearing Pat. No. 5,265,184, issued on Nov. 23, 1993, bearing Ser. No. 07/889,335, titled MOLDED WAVEGUIDE AND METHOD OF MAKING SAME, filed on May 28, 1992.

Briefly, molded optical portion 112' is made of any suitable optical material such as plastics, epoxies, polymers, or the like. In the present invention, prepared interconnect substrate 116', having photonic device 114' mounted thereon and members 121' operably coupled to electrical tracings 115', is placed into a molding system (not shown) and overmolded with molded optical portion 112', thereby encapsulating photonic device 114'. Once the molding process is completed, molded optical portion 112' is formed having surface 120' with a light port or lens device 113' molded therein. Additionally, lens element or lens device 113' is molded simultaneously with molded optical portion 112', thereby accurately and precisely placing light port or lens device 113' in position so as to guide light 119' into or out of working portion 118'. Further, alignment devices 117' are made by any suitable method, such as molding, milling, or the like. However, in a preferred embodiment of the present invention, alignment devices 117' are molded simultaneously with optical portion 112' and lens device 113' thereby providing accurate and precise alignment or placement of alignment devices 117', lens device 113' in relation to each other.

Additionally, it should be understood that materials used for optical portion 112' are optically clear with refractive indexes that are similar to refractive indexes of optical fiber 103', thereby allowing lens device 113' to diffract light 119' in a predetermined direction such that light 119' is guided toward working portion 118' of photonic device 114' or toward core region 104' of optical fiber 103'. While refractive index of optical portion 112' is capable of including the range of refractive indexes of optical fiber 103', in a preferred embodiment of the present invention, refractive index of optical portion 112' is similar to that of core region 103'. By molding lens device 113' to focus and direct light 109 either from working portion 118' of photonic device 114' to core region 104' or from core region 104' to working portion 118', extremely accurate and expensive robotic arms are not necessary because alignment tolerances between working portion 118' and core region 104' are relaxed, thus making optoelectronic interface device 102', as a whole, more manufacturable and less costly.

Electrical signals that either stimulate working portion 104' of photonic device 103' or electrical signals that are elicited from light stimulating working portion 104' of photonic device 114' are sent through conductive tracks 115'. As previously indicated, conductive tracks 115' are made by any suitable well-known method in the art. The electrical signals are then passed through conductive bumps 110' that are made by any suitable method well known in the art, such as solder bumps, gold bumps, conductive epoxy bumps, or the like. However, in a preferred embodiment of the present invention, gold bumps are used to provide a secure mechanical and electrical connection between electronic tracings 115' and photonic device 114'.

Optical connector 101' is made such that optical fiber 103' is held in a fixed position in relation to alignment devices 109', thereby providing a spatial orientation between core region 104' and alignment devices 109'. Further, alignment devices 109' are positioned such that alignment devices 109' are capable of engaging alignment devices 117' of molded optical portion 112'. In a preferred embodiment of the present invention, alignment devices 109' are detachably engaged with alignment devices 117' of molded optical portion 112', thereby aligning core region 104' to lens device 113' which in turn diffracts light 119' either into core region 104' or into working portion 118' of photonic device 114'. In the present invention, by engaging lens device 113', alignment of both core region 104' of optical fiber 103' and alignment of photonic device 114' are substantially relaxed, thereby providing a more manufacturable optoelectronic interface device 100' that does not require active alignment.

Figure 5:
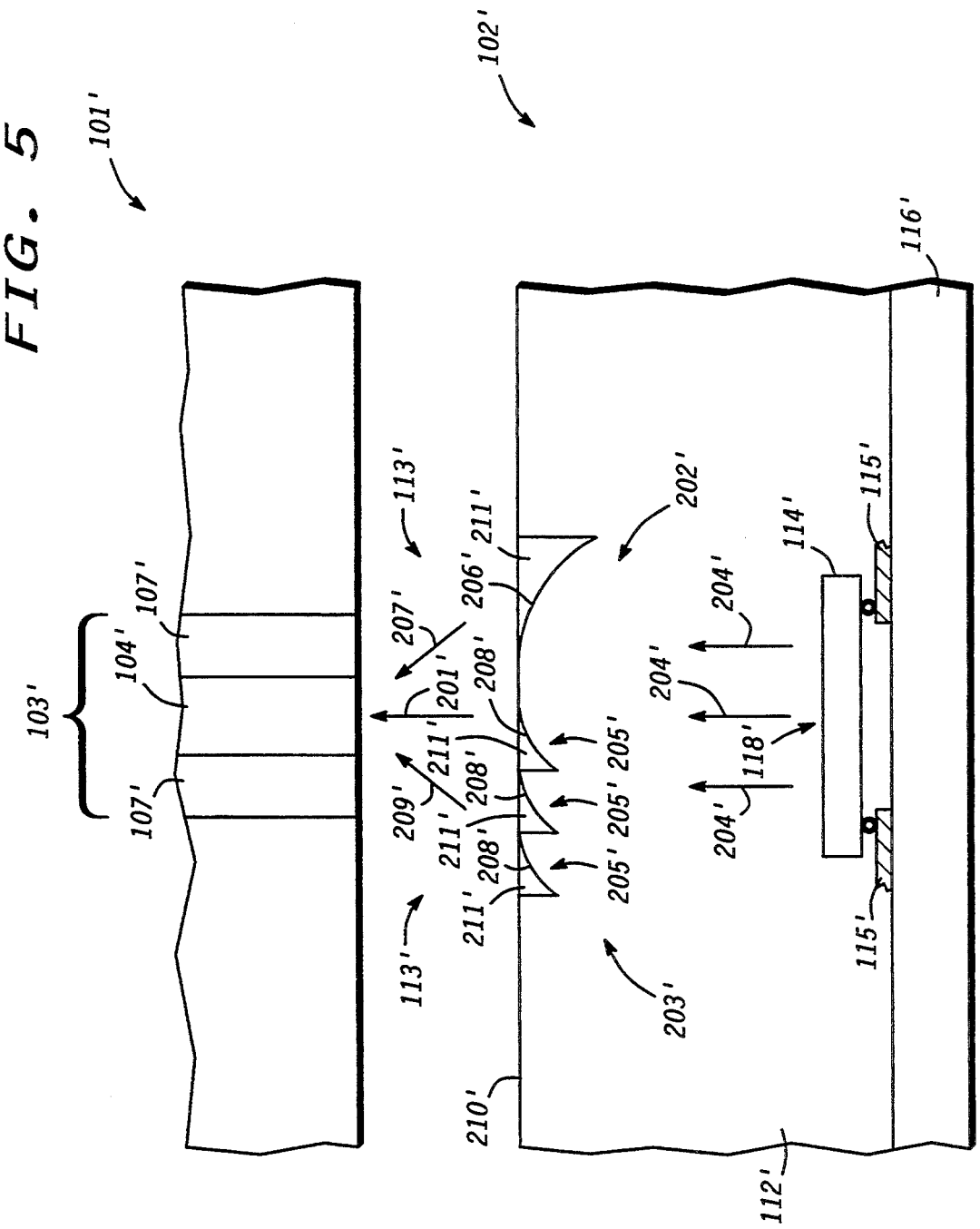
FIG. 5 is a highly enlarged simplified cross-sectional illustration of an embodiment of an optoelectronic interface device.

Regarding FIG. 5, a highly enlarged simplified cross-sectional illustration of a portion of optoelectronic innerface device 102' is illustrated. It should be understood that features having similar functions as illustrated in FIG. 4 will retain their original identifying numerals.

Referring now more specifically to lens device 113' and associated optical regions illustrated in FIG. 5, lens device 113' is illustrated with optical portions 202' and 203' that are separated by a dotted line 201'. Both optical portion 202' and optical portion 203' illustrate a portion of two lenses. In order to complete the illustrated optical portions 202' and 203', a mirror image of either optical portion 202', 203' is constructed and placed opposite to the already illustrated optical portion. For example, completing optical portion 202', a mirror image of optical pertion 202' is constructed. The mirror image is placed or substituted for optical portion 203', thereby resulting in a smooth convex curve or lens. Further, while FIG. 5 illustrates two forms of lens device 113', it should be understood that other lens devices are capable of being substituted, such as a diffraction grating, a holographic lens, or the like. Additionally, it should be understood that optical connector 101' would normally be butted against surface 210' in operating conditions; however, in the present illustration optical connector 101' is pulled away from surface 210' to better illustrate the present invention more clearly.

Lens portion 202' of lens device 113' is a convex optical lens that is molded simultaneously with molded optical portion 112'. Lens portion 203' of lens device 113' is a series of convex optical portions 205' that is molded simultaneously with optical portion 112'. Either optical portion 202' or 203' diffract light traveling through lens device 113' coming from working portion 118' in such a manner as to direct diffracted light, illustrated by arrows 207' and 209', into core region 104' of optical fiber 103'.

By way of example, light, illustrated by arrows 204', from working portion 118' of photonic device 114' is directed to lens device 1113'. In the case of optical portion 202', the light strikes and passes through surface 206' of optical portion 202', thus the light is diffracted toward core region 104'. The diffracted light, illustrated by arrow 207', is captured by core region 104' of optical fiber 103'. In the case of optical portion 203', light illustrated by arrows 204', is emitted from working portion 118' of photonic device 114'. The light subsequently strikes and passes through surfaces 208' of optical portion 203', thereby diffracting the light toward core region 104' of optical fiber 103'. The diffracted light, illustrated by arrow 209', is captured by core region 104' of optical fiber 103'.

Further, in the present invention, use of lens device 1113' allows working portion 118' of photonic device 114' to be misaligned or to have alignment tolerances relaxed, thereby providing a more manufacturable and cost effective alignment of core region 104' and working portion 118' of photonic device 114'. Moreover, it should be pointed out that spaces or openings 211' generated by molding lens device 113' are capable of being filled with an optical polymer, such as plastic, epoxy, polyimide, or the like so as to optimize transfer of the light from working portion 118' into core region 104'. In a preferred embodiment of the present invention, the material selected for filling spaces 211' has a refractive index similar to core region 103'.

Figure 6:
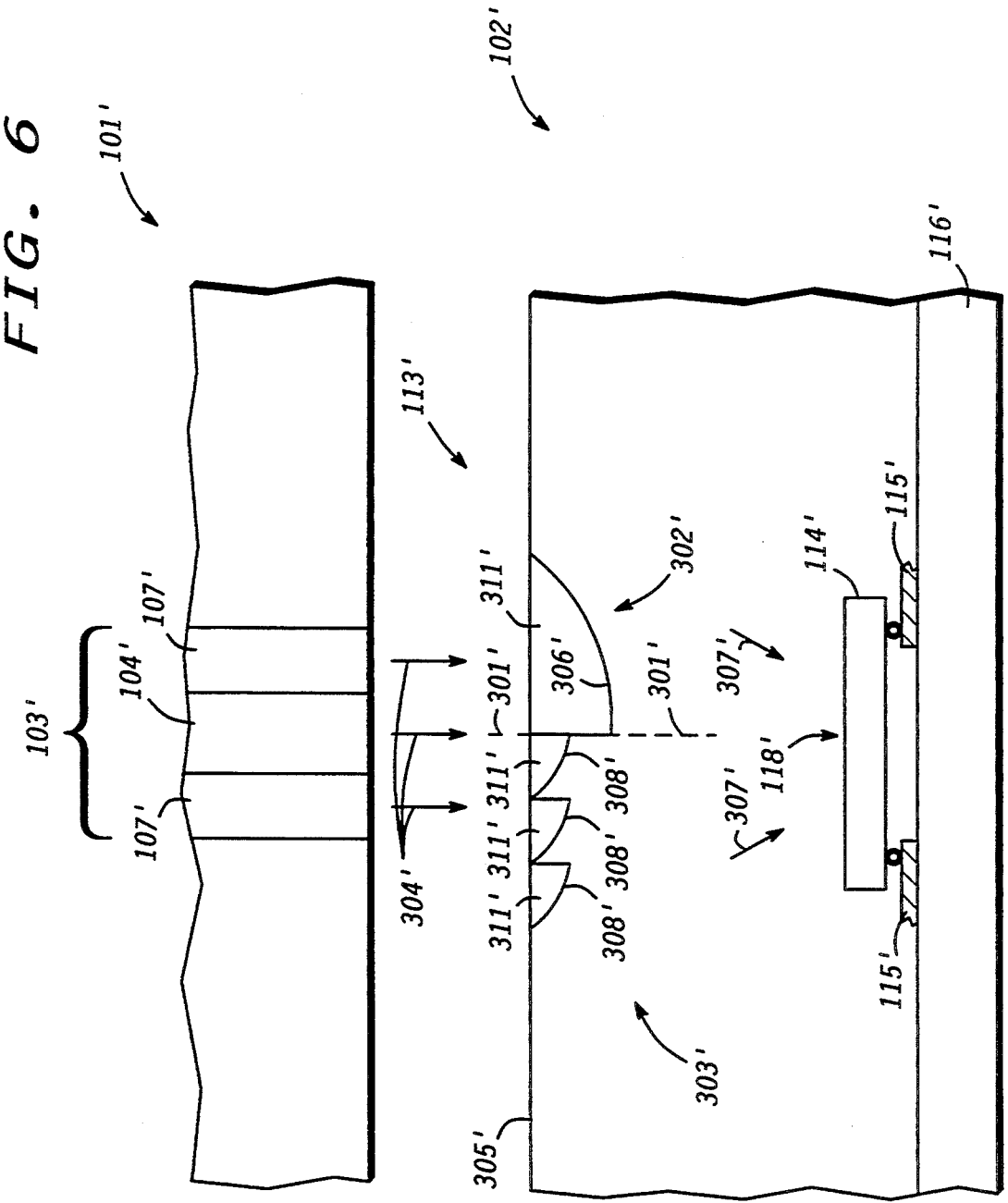
FIG. 6 is a highly enlarged simplified cross-sectional illustration of another embodiment of an optoelectronic interface device.

Regarding FIG. 6, a highly enlarged simplified cross-sectional illustration of a portion of optoelectronic interface device 102' is illustrated. It should be understood that similar features as presented in FIG. 4 and FIG. 5 will retain their original identifying numerals.

Referring now more specifically to lens device 113' and associated optical regions illustrated in FIG. 6, lens device 113' illustrates optical portions 302' and 303' that are separated by dotted line 301'. Both optical portions 302' and 303' illustrate a portion of two lenses. (Completion of mirror images of optical portions 302' and 303' is achieved as discussed hereinabove. Further, while FIG. 6 illustrates two forms of lens device 113', it should be understood that other lens devices are capable of being substituted, such as a diffraction grating, a holographic lens, or the like. Additionally, it should be understood that optical connector 101' would normally be butted against surface 305' in operating conditions; however, in the present illustration, optical connector 101' is pulled away from surface 305', thereby illustrating the present invention more clearly.

For example, light, illustrated by arrows 304', from core region 104' of optical fiber 103' is directed to lens device 113'. In the case of optical portion 302', the light strikes and passes through surface 306' of optical portion 302', thus the light is diffracted toward working portion 118' of photonic device 114'. The diffracted light, illustrated by arrow 307', is captured by working portion 118' of photonic device 114'. In the case of optical portion 303', light, illustrated by arrows 304', strikes and passes through surfaces 308' of optical portion 303', thereby diffracting the light toward working portion 118' of photonic device 114'. The diffracted light, illustrated by arrow 309', is captured and collected by the working portion of photonic device 114'.

Additionally, in a preferred embodiment of the present invention, higher performance of both optical portions 302' and 303' are capable of being achieved by filling spaces 311' with an optically transparent material, such as plastic, polymer, polyimide, or the like. It should be further understood that selection of optical materials to fill spaces 311' should have a similar refractive index as optical fiber 103', thereby optimizing transmittance of the light through lens device 113' and toward working portion 118' of photonic device 114'.

Figure 7:
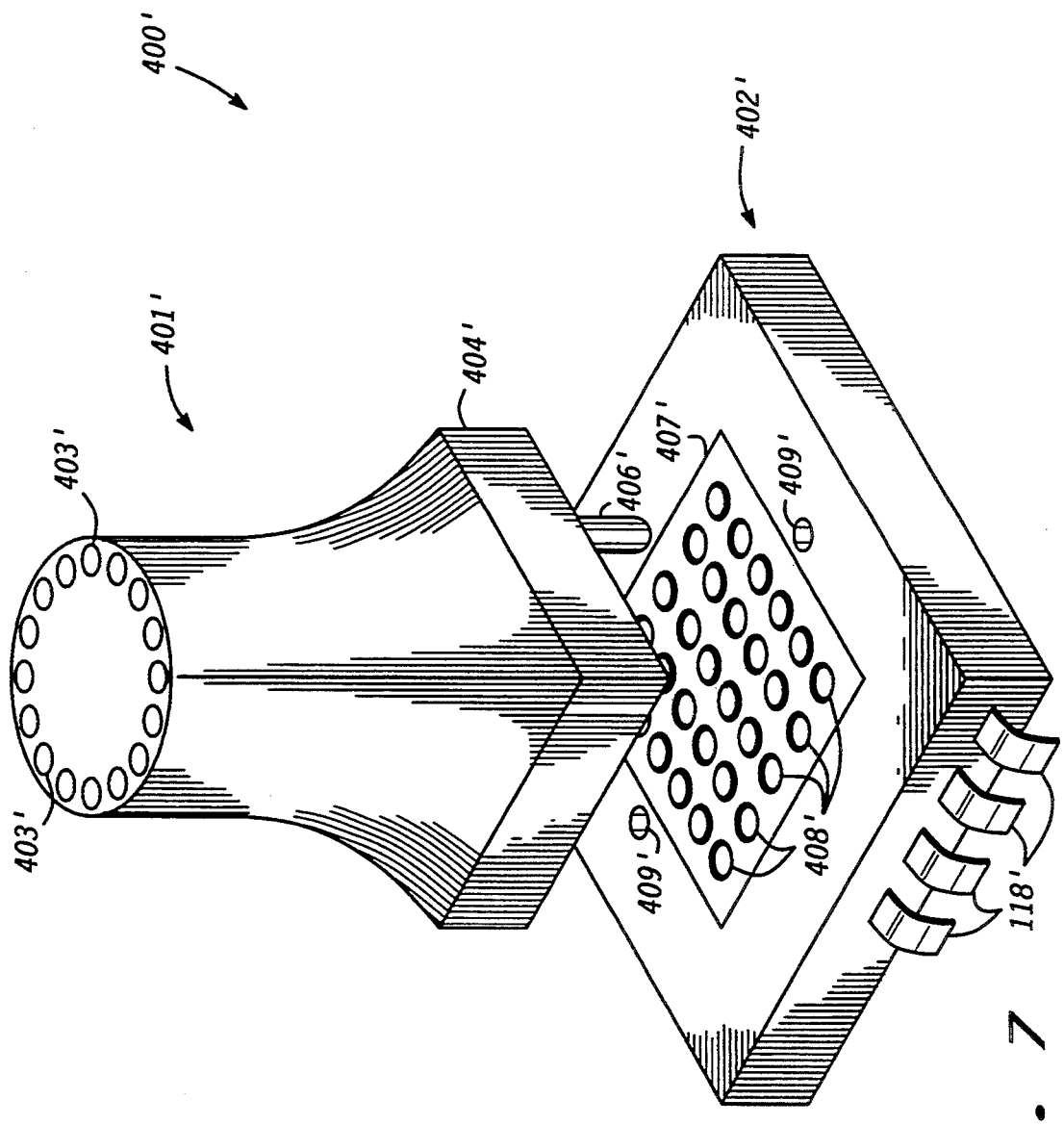
FIG. 7 is an enlarged perspective view of still yet another optoelectronic interface module.

FIG. 7 is an enlarged perspective view of an optoelectronic interconnect module 400'. Optoelectronic interface module 400' includes optical connector 401' and optoelectronic interface device 402'. As can be seen in FIG. 7, optical connector 401' is made having a plurality of optical fibers 403' that are fixed and positioned by a body 404' in such a manner that a plurality of core regions (not shown) of the plurality of optical fibers 403' are exposed so as to be able to be operably coupled to a plurality of lenses 408'. Further, optical connector 401' is made with alignment devices 406' (only one is shown), thereby fixing spatial orientation of the plurality of core regions in relation to body 403' and alignment devices 406'.

Optoelectronic interface device 402' is made in a similar manner as has been described hereinabove. However, surface 407' of optoelectronic interface device 402' is illustrated with the plurality of lens devices 408'. The plurality of lens devices 408' is made as previously described hereinabove, as well as alignment devices 409'. Engagement of alignment devices 406' with alignment devices 409' aligns the plurality of core regions of the plurality of optical fibers 403' with the plurality of lens devices 408' such that the core regions are operably engaged to the plurality of lens devices so as to direct light into and out of optoelectronic interface device 402'. Additionally, output members 118' are seen extending from optoelectronic innerface device 402'. These output members 118' are then capable of being further electrically interconnected to other electronic components or systems, such as printed circuit boards, computer boards, or the like.

By now it should be appreciated that a novel optoelectronic interface device and method of making same have been described. The optoelectronic interface device incorporates an optical portion that encapsulates a photonic device such that optical fibers in the optical connector and the working portion of the photonic device are operably coupled. The optoelectronic interface device incorporates a lens device into an optical portion encapsulating a photonic device such that optical fibers in the photonic device are operably coupled. Further, use of the optoelectronic interface device relaxes alignment tolerances that result in a cost effective manner of manufacturing. Additionally, the method of making the optoelectronic interface device allows for the incorporation of standard electronic components with photonic devices in a highly manufacturable process.

Further, use of the optoelectronic interface device relaxes alignment tolerances that results in a cost effective method of manufacturing. Additionally, the method of making the optoelectronic interface device allows for the incorporation of standard electronic components with photonic devices in a highly manufacturable process.

What is claimed is:

1. An optoelectronic interface comprising:
   an interconnect substrate having a surface with a plurality of electrical tracings disposed on the surface of the interconnect substrate;
   a photonic device having a working portion, the photonic device including a contact electrically coupled to at least one of the plurality of electrical tracings of the interconnect substrate; and
   a molded optical portion encapsulating the photonic device, the molded optical portion forming a surface having a distance between the surface and the working portion of the photonic device for directing light between the photonic device and the surface of the molded optical portion.

2. An optoelectronic interface as claimed in claim 1 wherein the photonic device is an optical transmitter.

3. An optoelectronic interface as claimed in claim 2 wherein the optical transmitter is an VCSEL.

4. An optoelectronic interface as claimed in claim 2 wherein the optical transmitter is an LED.

5. An optoelectronic interface as claimed in claim 1 wherein the photonic device is an optical receiver.

6. An optoelectronic interface as claimed in claim 5 wherein the optical receiver is an photo diode.

7. An optoelectronic interface as claimed in claim 6 wherein the photo diode is a p-i-n photo diode.

8. An optoelectronic interface as claimed in claim 1 wherein the interconnect substrate further includes an integrated circuit operably connected the electrical tracings.

9. An optoelectronic interface as claimed in claim 1 further comprising an the alignment apparatus positioned in molded optical portion is a cavity.

10. An optoelectronic interface as claimed in claim 1 wherein the alignment apparatus of the molded optical portion is a opening.

11. An optoelectronic interface as claimed in claim 1 further comprising an optical connector including an optical fiber and an alignment apparatus, the optical connector fixing and positioning the optical fiber in relation to the alignment apparatus of the optical connector such that mating of the alignment apparatus of the molded optical portion and the alignment apparatus of the optical connector aligning the optical fiber to the working portion of the photonic device.

12. An optoelectronic interface as claimed in claim 1 wherein the photonic device is formed as an array of photonic devices.

13. An optoelectronic package for coupling an optical fiber to a photonic device comprising:
    an interconnect substrate having a surface with a plurality of electrical tracings disposed on the surface of the interconnect substrate;
    a plurality of external leads, wherein one of the external leads is electrically and mechanically coupled to at least one of the plurality of electrical tracings on the surface of the interconnect substrate;
    a photonic device having a working portion mounted on the interconnect substrate, wherein the working portion operably coupled to the at least one of the plurality of electrical tracings on the interconnect substrate; and
    a molded optical portion that encapsulates the photonic device, the molded optical portion forming a surface having a distance, the distance being defined by the surface of the molded optical portion and the working portion of the photonic device, thereby directing light between the photonic device and an external light communicating structure through the molded optical portion having an alignment apparatus molded therein.

14. An optoelectronic package for coupling an optical fiber to a photonic device as claimed in claim 13 wherein the photonic device is formed as an array of photonic devices.

15. An optoelectronic package for coupling an optical fiber to a photonic device as claimed in claim 14 further comprising an optical connector including an optical fiber bundle and an alignment apparatus, the optical connector fixing and positioning the optical fiber bundle in relation to the alignment apparatus of the optical connector such that mating of the alignment apparatus of the molded optical portion and the alignment apparatus of the optical connector aligns each individual optical fiber of the optical fiber bundle to the working portion of the molded optical portion.

16. An optoelectronic interface comprising:
    an optical connector having an optical fiber with a core region and a cladding region, the core region and the cladding region have refractive indexes respectively;
    an interconnect substrate having a surface with a plurality of electrical tracing disposed on the surface of the interconnect substrate;
    a photonic device having a working portion, the photonic device including a contact electrically coupled to at least one of the plurality of electrical tracings of the interconnect substrate; and
    a molded optical portion having a refractive index that encapsulates the photonic device, the molded optical portion forming a height between the working portion of the photonic device and a surface of the molded optical portion, the height is determined by the following mathematical inequality:

$$h \leq \frac{x - \frac{d}{2}}{\tan \theta_{2c}}$$

where h is equal to the height between the surface and the working portion, where d is equal to a width of the working portion, where x is equal to one half of a desired spot size, and where $\Theta_{2c}$ is determined by the following mathematical inequality:

$$\theta_{2c} \leq \sin^{-1}\left[\frac{n_3}{n_4}\cos\left(\sin^{-1}\left(\frac{n_2}{n_3}\right)\right)\right]$$

where $n_3$, $n_2$, and $n_4$ are refractive indexes of the core region, the cladding region, and the molded optical portion, respectively, thereby determining $\Theta_{2c}$.

17. A method for making an optoelectronic interface comprising the steps of:
provideing an interconnect substrate having a surface with a plurality of electrical tracings disposed on the surface of the interconnect substrate;
mounting a photonic device having a working portion and having a contact so as to electrically couple the contact to at least one of the plurality of electrical tracings on the interconnect substrate; and
molding an optical portion having an alignment apparatus that encapsulates the photonic device, the molded optical portion forming a surface having a distance between the surface and the working portion of the photonic device that passes light between the working portion of the photonic device and the surface.

18. An optoelectronic interface comprising:
an interconnect substrate having a surface with a plurality of electrical tracings disposed on the surface of the interconnect substrate;
a photonic device having a working portion, the photonic device including a contact electrically coupled to an electrical tracing of the plurality of electrical tracings on the interconnect substrate; and
a molded optical portion encapsulating the photonic device, the molded optical portion forming a surface having a light port molded therein, the light port including a lens device molded in the surface of the light port for directing light between the photonic device and an external light communicating structure, and the molded optical portion having an alignment apparatus molded therein.

19. An optoelectronic interface as claimed in claim 18 wherein the photonic device is an optical transmitter.

20. An optoelectronic interface as claimed in claim 19 wherein the optical transmitter is an VCSEL.

21. An optoelectronic interface as claimed in claim 19 wherein the optical transmitter is an LED.

22. An optoelectronic interface as claimed in claim 18 wherein the photonic device is an optical receiver.

23. An optoelectronic interface as claimed in claim 22 wherein the optical receiver is a photodiode.

24. An optoelectronic interface as claimed in claim 23 wherein the photo diode is a p-i-n photo diode.

25. An optoelectronic interface as claimed in claim 18 wherein the lens is a diffractive optical element.

26. An optoelectronic interface as claimed in claim 25 wherein the diffractive optical element is a Fresnel lens.

27. An optoelectronic interface as claimed in claim 25 wherein the diffract ire optical element is a holographic lens.

28. An optoelectronic interface as claimed in claim 18 wherein the alignment apparatus of the molded optical portion is a cavity.

29. An optoelectronic interface as claimed in claim 18 wherein the alignment apparatus of the molded optical portion is a protrusion.

30. An optoelectronic interface as claimed in claim 18 further comprising an optical connector including an optical fiber and an alignment apparatus, the optical connector fixing and positioning the optical fiber in relation to the alignment apparatus of the optical connector such that mating of the alignment apparatus of the molded optical portion and the alignment apparatus of the optical connector aligns the optical fiber to the lens device molded in the molded optical portion.

31. An optoelectronic innerface as claimed in claim 18 wherein the photonic device is formed as an array of photonic devices.

32. An optoelectronic interface as claimed in claim 31 further comprising an optical connector including an optical fiber bundle and an alignment apparatus, the optical connector fixing and positioning the optical fiber bundle in relation to the alignment apparatus of the optical connector such that mating of the alignment apparatus of the molded optical portion and the alignment apparatus of the optical connector aligns each individual optical fiber of the optical fiber bundle to the light port molded in the molded optical portion.

33. An optoelectronic package for coupling an optical fiber to a photonic device comprising:
an interconnect substrate having a surface with a plurality of electrical tracings disposed on the surface of the interconnect substrate;
a plurality of external leads, wherein one of the plurality of external leads is electrically and mechanically coupled to one of the plurality of electrical tracings on the surface of the interconnect substrate;
a photonic device having a working portion mounted on the interconnect substrate, wherein the working portion operably coupled to one of the plurality of electrical tracings on the interconnect substrate; and
a molded optical portion that encapsulates the photonic device, the molded optical portion forming a surface having a light port molded therein, the light port includes a lens device molded into the surface or the light port to direct light between the photonic device and an external light communicating structure and the optical portion having an alignment apparatus molded therein.

34. An optoelectronic package for coupling an optical fiber to a photonic device as claimed in claim 33 wherein the photonic device is formed as an array of photonic devices.

35. An optoelectronic package for coupling an optical fiber to a photonic device as claimed in claim 34 further comprising an optical connector including an optical fiber bundle and an alignment apparatus, the optical connector fixing and positioning the optical fiber bundle in relation to the alignment apparatus of the optical connector such that mating of the alignment apparatus of the molded optical portion and the alignment apparatus of the optical connector aligns each individual optical fiber of the optical fiber bundle to the light port molded in the molded optical portion.

36. An optoelectronic interface comprising:
an interconnect substrate having a surface with a plurality of electrical tracings disposed on the surface of the interconnect substrate;

a photonic device having a working portion, the photonic device including a contact electrically coupled to one of the plurality of electrical tracings on the interconnect substrate; and a molded optical portion encapsulating the photonic device, the molded optical portion forming a surface having a light port affixed thereon for directing light between the photonic device and an external light communicating structure, and the optical portion having an alignment apparatus molded therein.

37. An optoelectronic interface as claimed in claim 36 wherein the light port is a hologram.

38. An optoelectronic interface as claimed in claim 36 wherein the light port is an optical lens.

39. An optoelectronic interface as claimed in claim 36 wherein the light port is diffraction optical element.

40. A method for making an optoelectronic interface comprising the steps providing an interconnect substrate having a surface with a plurality of electrical tracings disposed on the surface of the interconnect;

mounting a photonic device having a working portion and having a contact electrically coupled to one of the plurality of electrical tracings on the interconnect substrate; and molding an optical portion encapsulating the photonic device, the molded optical portion forming a surface having a light port molded therein, the light pore directing light between the photonic device and an external light communicating structure and having an alignment apparatus molded therein.

41. A method for making an optoelectronic interface as claimed in claim 40 wherein the step of mounting the photonic device having a working portion and a contact electrically coupled to one of the plurality of electrical tracings is achieved with a conductive bump.

42. A method for making an optoelectronic interface as claimed in claim 41 wherein the mounting of the photonic device to one of the plurality of electrical tracings is achieved by making the conductive bump from a material selected from a group comprising gold, silver, solder, and conductive epoxy.

* * * * *